United States Patent
Tighe

(10) Patent No.: US 9,567,075 B2
(45) Date of Patent: Feb. 14, 2017

(54) TILT WING AERIAL VEHICLE

(71) Applicant: Northrop Grumman Systems Corporation, Falls Church, VA (US)

(72) Inventor: Thomas S. Tighe, Pasadena, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 392 days.

(21) Appl. No.: 14/176,960

(22) Filed: Feb. 10, 2014

(65) Prior Publication Data

US 2015/0225071 A1    Aug. 13, 2015

(51) Int. Cl.
*B64C 29/02* (2006.01)
*B64C 39/02* (2006.01)

(52) U.S. Cl.
CPC ............ *B64C 39/024* (2013.01); *B64C 29/02* (2013.01); *B64C 2201/021* (2013.01); *B64C 2201/042* (2013.01); *B64C 2201/088* (2013.01); *B64C 2201/104* (2013.01); *B64C 2201/108* (2013.01); *B64C 2201/162* (2013.01)

(58) Field of Classification Search
CPC ............ B64C 29/0033; B64C 39/024; B64C 2201/108; B64C 2201/042
USPC ....................................................... 244/12.4
See application file for complete search history.

(56) References Cited

U.S. PATENT DOCUMENTS

| | | | |
|---|---|---|---|
| 2,328,786 A * | 9/1943 | Crowder | 244/7 B |
| 2,382,460 A * | 8/1945 | Young | 244/7 B |
| 2,479,125 A * | 8/1949 | Leonard | 244/7 B |
| 2,712,420 A * | 7/1955 | Amster et al. | 244/7 B |
| 3,666,209 A | 5/1972 | Taylor | |
| D345,396 S | 3/1994 | Delaney | |
| 6,659,394 B1 | 12/2003 | Shenk | |
| 6,892,980 B2 | 5/2005 | Kawai | |
| 7,028,948 B2 | 4/2006 | Pitt | |
| 7,118,066 B2 * | 10/2006 | Allen | 244/7 B |
| 7,665,688 B2 | 2/2010 | Cylinder et al. | |
| 7,997,526 B2 * | 8/2011 | Greenley | 244/7 B |
| 8,146,854 B2 * | 4/2012 | Lawrence | 244/17.23 |
| 8,337,156 B2 * | 12/2012 | Khmel | 416/27 |

(Continued)

OTHER PUBLICATIONS

ISR and Written Opinion for PCT/US2015/014314. Issued on May 14, 2015.

*Primary Examiner* — Brian M O'Hara
*Assistant Examiner* — Keith L Dixon
(74) *Attorney, Agent, or Firm* — Stetina Brunda Garred & Brucker

(57) ABSTRACT

A multi-engine aircraft is disclosed which is convertible from horizontal flight mode to a vertical flight mode. The aircraft comprises an aircraft fuselage defining a fuselage longitudinal axis, and the first and second wing attached to the fuselage. Each wing defines first and second wing segments. The first segments are translatable about the fuselage longitudinal axis, from a horizontal mode position adjacent the second wing segments to vertical fight mode wherein the first wing segment are substantially offset from the second wing segments. An aircraft propulsion unit is attached to each of the first and second wing segments. The propulsion units attached to a common wing being disposed in substantial axial alignment when the aircraft operates in a horizontal flight mode, and being substantially offset when the aircraft operates in a vertical flight mode. A sensor unit is connected to a forward portion of the fuselage.

14 Claims, 3 Drawing Sheets

(56) References Cited

U.S. PATENT DOCUMENTS

| | | |
|---|---|---|
| 8,356,770 B2 | 1/2013 | Parks |
| 8,453,962 B2 * | 6/2013 | Shaw .......................... 244/17.23 |
| 8,602,348 B2 * | 12/2013 | Bryant ......................... 244/12.4 |
| 8,733,690 B2 * | 5/2014 | Bevirt et al. ................. 244/12.4 |
| 8,800,912 B2 * | 8/2014 | Oliver ......................... 244/12.4 |
| 8,931,730 B2 * | 1/2015 | Wang et al. ............... 244/17.17 |
| 2005/0230519 A1 | 10/2005 | Hurley |
| 2006/0011777 A1 * | 1/2006 | Arlton et al. ................ 244/7 B |
| 2010/0243794 A1 | 9/2010 | Jermyn |
| 2011/0001020 A1 | 1/2011 | Forgac |
| 2012/0248259 A1 * | 10/2012 | Page et al. .................... 244/7 A |
| 2014/0008498 A1 | 1/2014 | Reiter |

* cited by examiner

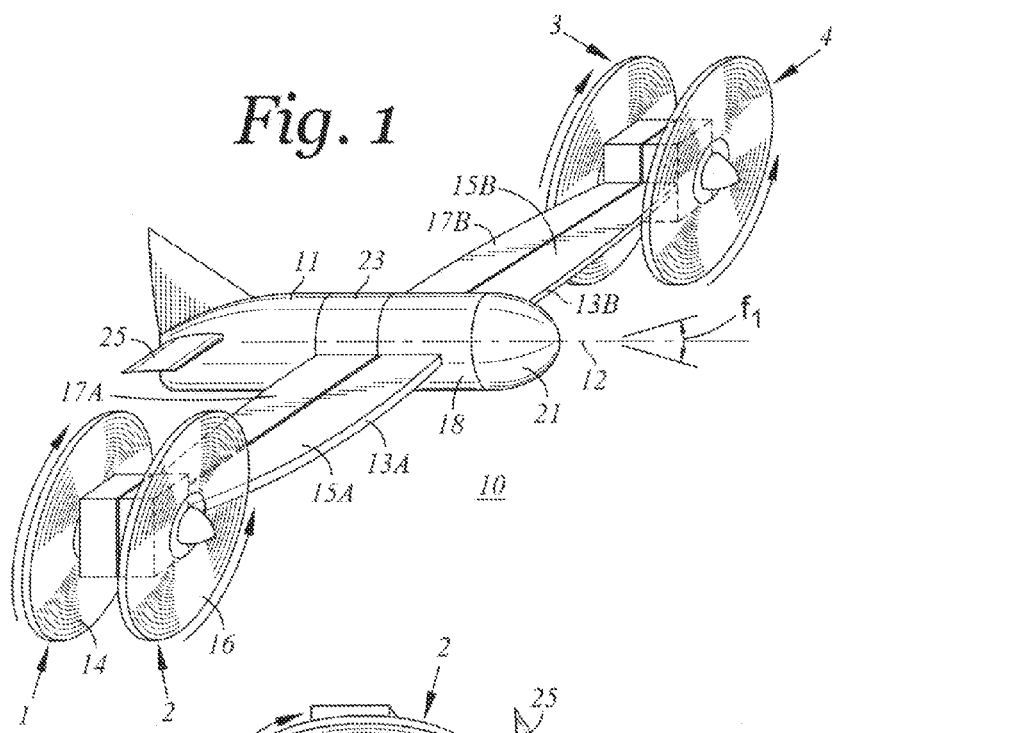
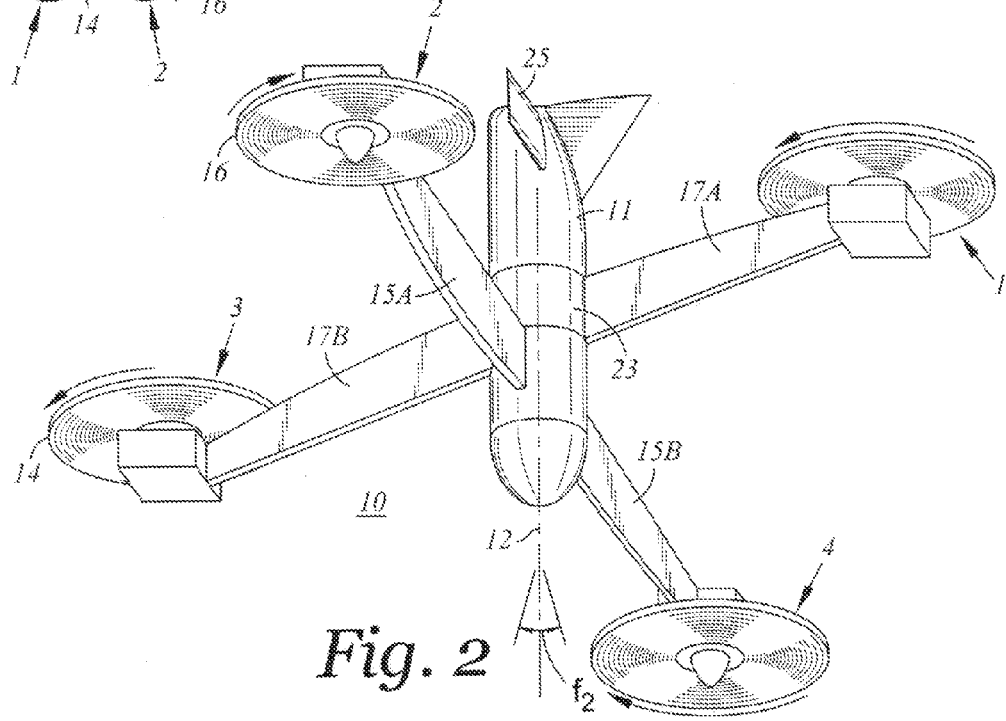

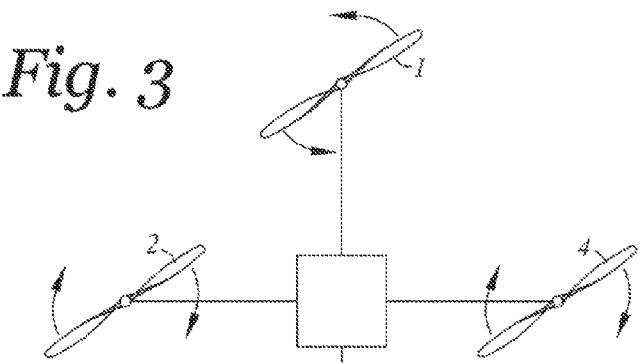
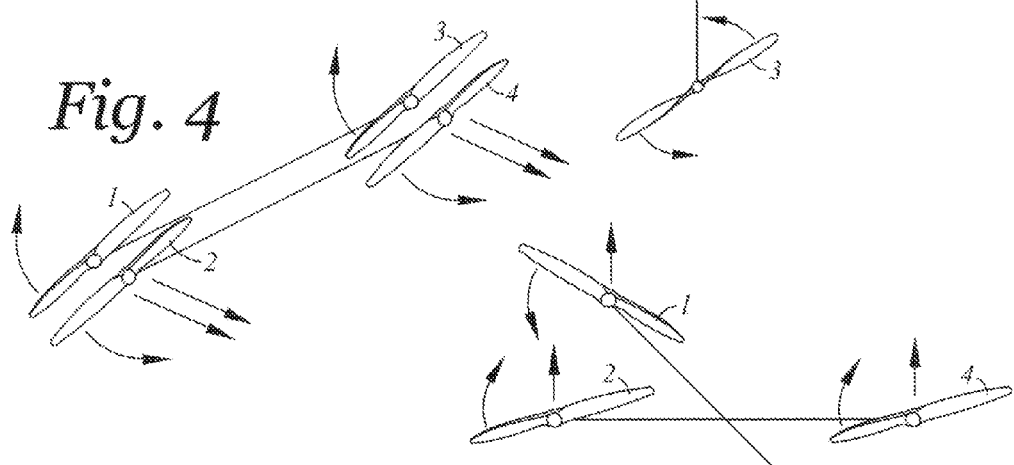
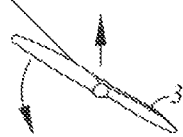
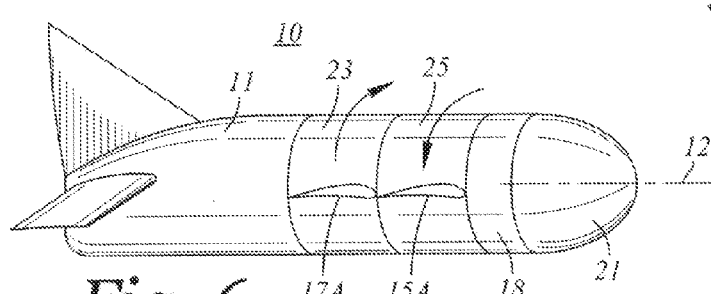

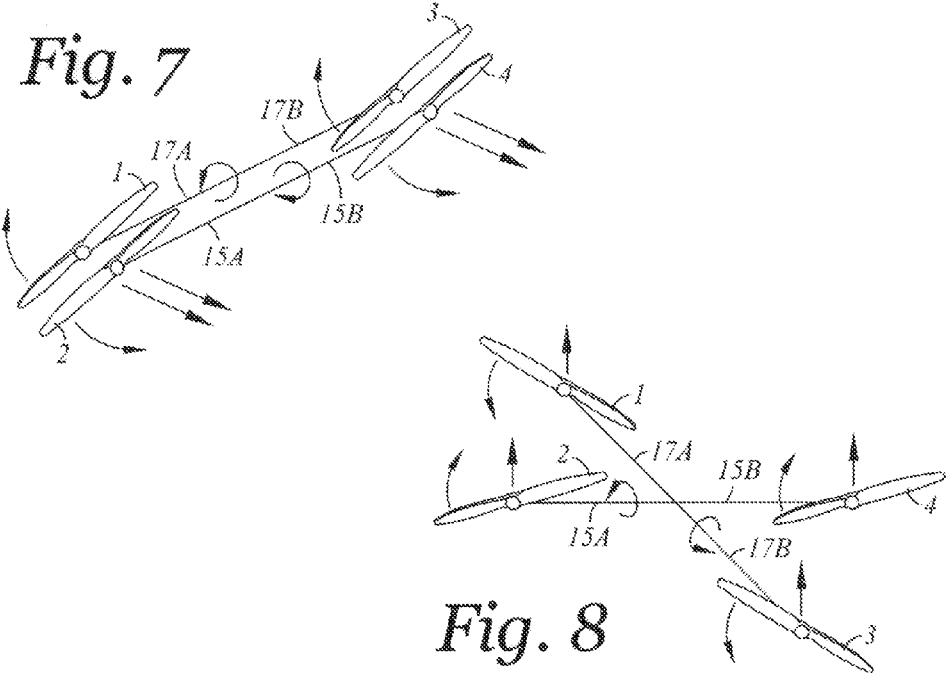
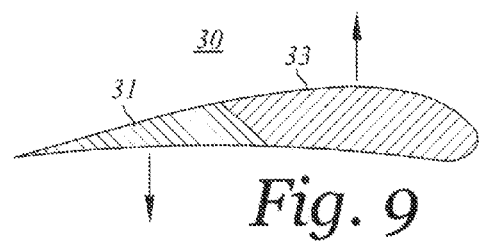
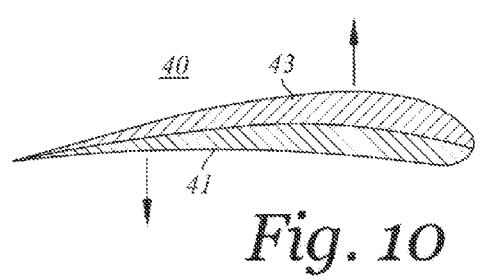

TILT WING AERIAL VEHICLE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to an aircraft, and more particularly an aircraft designed for horizontal as well as vehicle flight.

In broad classification, aircraft are designated as fixed wing aircrafts or rotary wing aircraft. A fixed wing aircraft encompasses the bulk of commercial and military aircraft. Rotary wing aircraft traditionally encompass various types of helicopters and other vehicles where the propulsion system is primarily oriented for vertical lift, rather than horizontal flight, as is the case for a fixed wing aircraft.

Various types of aircraft have been implemented or proposed wherein the propulsion system translates from a horizontal plane to a vertical plane, or where an engine thrust is vectored between a horizontal plane and a vertical plane.

The ability of an aircraft to operate both in a horizontal flight mode and in a vertical lift/loitering mode can be advantageous, particularly in a certain application. Horizontal flight mode typically allows for higher speeds and greater range. Vertical flight mode allows for takeoffs and landings in small areas. Vertical flight mode also allows for a more precise loitering which may be useful for civil and military applications, e.g. for traffic reporting, police crime scene investigation, and military surveillance systems.

The particular manner in which an aircraft translates from horizontal to vertical mode is significant, as complex systems may be more expensive and subject to greater operational failure.

In addition to translation of the propulsion system or thrust directions, other aircraft systems or payloads may also need to translate relative to the orientation of the propulsion system, or relative to the direction of flight.

For example, payloads may include guidance or surveillance systems which may be preferably forward looking doing horizontal flight, to facilitate navigation. However, when the aircraft is in a vertical/loitering flight mode it may be preferable to orient a surveillance system downwards, to continually view the area immediately below the aircraft. While mechanical scanning systems and electronic scanning systems, which operate to vary the boresight direction, are well known in the art, they commonly add expense, complexity, and weight to the payload. Such complexity and weight may be unacceptable, particularly where the aircraft is a small, unmanned aerial vehicle (UAV). Some UAVs weigh ten (10) pounds or less so the payloads must also be very light. In UAV implementations, use of a staring sensor, rather than a scanning sensor, may be preferable from a cost, weight, and complexity standpoint.

Accordingly, it is desirable to provide an aircraft that operates in both a horizontal flight mode and vertical flight mode, to provide a greater range and allow operation in small, and unimproved areas.

It is also preferable to provide an aircraft that includes a sensor or a surveillance payload which, in a horizontal flight mode is oriented in a horizontal plane, i.e. forward, but in a vertical flight mode, is oriented in a vertical plane, i.e. downward, without reorienting the sensor boresight angle relative to the fuselage.

It is further advantageous to implement these advantages in a UAV that is light weight, simple and relatively inexpensive.

These and other objects and advantages are implemented in the present invention, which is described below in relation accompanying drawings and claims.

BRIEF SUMMARY

A multi-engine aircraft is disclosed which is convertible from horizontal flight mode to a vertical flight mode. The aircraft comprises an aircraft fuselage defining a fuselage longitudinal axis, and the first and second wing attached to the fuselage. Each wing defines first and second wing segments. The first segments are translatable about the fuselage longitudinal axis, from a horizontal mode position adjacent the second wing segments to vertical fight mode wherein the first wing segment are substantially offset from the second wing segments. An aircraft propulsion unit is attached to each distal portion of each of the first and second wing segments. The propulsion units attached to the first wing segments being disposed in substantial axial alignment when the aircraft operates in a horizontal flight mode, and being substantially offset when the aircraft operates in a vertical flight mode. A sensor unit is connected to a forward portion of the fuselage. The sensor unit defines a field of view substantially along the fuselage center axis.

Each of the propulsion units produces a thrust substantially in the same direction when the aircraft operates in the horizontal mode and the vertical mode. However, the propellers/fans of the propulsion units attached to segments of a common wing rotate in the opposite directions.

In the presently preferred embodiment the first segment of the first wing and the first segment of the second wing are attached to a collar formed in the fuselage. The collar is rotatable about the fuselage center axis to facilitate translation of the wing segments from a horizontal flight mode orientation to a vertical flight mode orientation.

The direction of rotation of each of the propellers/fans used in the propulsion unites reverses in the course of translating between the horizontal flight mode and the vertical flight mode.

The aircraft sensor field view is directed for the aircraft, along the fuselage center axis, when the aircraft operates in a horizontal flight mode, but downwardly below the aircraft, along the fuselage center axis, when the aircraft operates in the vertical flight mode.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is an illustration of one embodiment of the invention, showing the aircraft in a horizontal flight mode;

FIG. 2 is an illustration of one embodiment of the invention, showing the aircraft in a vertical/loitering flight mode;

FIG. 3 is a schematic diagram illustrating the direction of the rotor rotation of the propulsion units when the aircraft is vertical/loitering flight mode;

FIG. 4 is a schematic diagram illustrating the direction of rotation of the propulsion unit, and the thrust direction, when the aircraft is in a horizontal flight mode;

FIG. 5 is a schematic diagram illustrating the direction of rotation of the propulsion unit, and the thrust direction, when the aircraft is in a downwardly facing, vertical flight mode;

FIG. 6 is an illustration of a rotary joint which allows a section of the fuselage to rotate about the fuselage center line;

FIG. 7 is an illustration of the torque applied to the wing segments when the wings are in a horizontal flight mode;

FIG. 8 is an illustration of the torque applied to the wing segments when the wings are in a vertical/loitering flight mode;

FIG. 9 illustrates an exemplary forward/rear segmented wing used in accordance with the present invention; and FIG. 10 illustrates an exemplary horizontally segmented wing used in accordance with the present invention.

DETAILED DESCRIPTION

FIG. 1 illustrates one embodiment of a multi-engine aircraft that is convertible from a horizontal flight mode to a vertical flight mode in accordance with the present invention. As shown therein aircraft 10 includes an aircraft fuselage 11 and a pair of wings 13A, 13B. Each wing is formed of two separable portions, as described in more detail below. Wing 13A is formed to include wing segments 15A, 17A. Wing 13B is formed to include wing segments 15B, 17B. In the horizontal flight mode wing segment 15B is adjacent to and substantially is coplanar with wing segment 17B, and wing segment 15A is adjacent to and substantially coplanar with wing segment 17A. An aircraft propulsion unit is attached to each of the wing segments. Propulsion unit 1 is attached to wing segment 17A and propulsion unit 2 is attached to wing segment 15A. Propulsion unit 3 is attached to wing segment 17B and propulsion unit 4 is attached to wing segment 15B. Propulsion units 1 and 2 are in substantial axial alignment when the aircraft 10 is in the horizontal flight mode, as shown in FIG. 1. Propulsion units 3 and 4 are similarly in substantial axial alignment in the horizontal flight mode. Sensor unit 21 is attached to fuselage forward portion 18. The sensor 21 is directed to images in a field of view f1, which encompasses an area along the fuselage center axis 12, forward of the aircraft unit 10, as it travels in a horizontal flight mode.

Aircraft 10 includes 1 or more rotatable collar(s) 23 formed in fuselage 11 and attached to the adjacent wing segments 17A, 17B. In an alternate embodiment a second collar (not shown) may be attached to wing segment 15A, 15B. As is described in more detail below rotating collar 23 facilitates rotation of wing segments 17A, 17B about the fuselage center axis 12. In the presently preferred embodiment, wing segments 15A, 15B, 17A, and 17B are all in a common vertical plane, when the aircraft operates in a horizontal flight mode. However, in the vertical flight mode wing segments 17A, 17B rotate approximately 90° degrees about the fuselage center line 12 to the positions shown at FIG. 2. In the presently preferred embodiment wing segments 15A, 15B remain stationary while wing segments 17A, 17B rotate.

Returning to FIG. 1, propulsion units 1 and 2 are formed to produce thrust in substantially the same direction, i.e. forward when the aircraft 10 is operated in a horizontal flight mode. Propulsions units 3 and 4 similarly produce thrust in the same, forward direction, when the aircraft 10 is operating in a horizontal flight mode. However, propellers or fans used in the adjacent propulsion units rotate in opposite directions. The counter-rotating propellers 14, 16 prevent the aircraft 10 from rotating, or spinning when the aircraft is operated in a vertical flight mode, as shown at FIG. 2. To maintain the same direction of thrust from the propulsion units, even where the propellers or fans are rotating in opposite directions, the blade angle of one of the adjacent propulsion units must be reversed from the blade angle of the other propulsion unit. As such, the blade angle of the propellers or fans used in propulsion unit 1 is reversed from the blade angle of the propellers or fans used in propulsion unit 2. Similarly, the blade angle of the propellers or fans used in propulsion unit 3 is opposite of the blade angle of the propellers or fans used in propulsion unit 4.

In order to transition from horizontal flight mode, to vertical flight mode the opposing wing segments 17A, 17B must translate from a horizontal plane to a substantially perpendicular plane, as shown at FIG. 2. Additionally, the forward thrust produced by the propulsion units must be reversed so that the aircraft 10 may reduce forward motion. The reduction of the forward motion, in combination with the movement the aircraft control surfaces, such as control surfaces 25 and reversal of the thrust produced by the propulsion units 1, 2, 3 and 4 urges, i.e. reversing the rotation of the propellers or fans, urges the aircraft 10 into a vertical, downward facing orientation, whereupon sensor unit 21 observes a field of view f2, which is directed to an area below the aircraft. The aircraft may remain in substantially stationary position (i.e. hovering or loitering) while gathering data on an area below the aircraft as desired. The upward thrust provided by propulsion units 1, 2, 3 and 4 urges the aircraft 10 to hover at a desired altitude. When the data gathering has been completed the aircraft may transition into horizontal flight mode and travel to another area that may also need to be investigated, or it may return to its base. The aircraft 10 transitions from a vertical flight mode to the horizontal flight mode in substantially the reverse manner described above.

As shown at FIGS. 9, 10, wings 13A, 13B may be segmented in different ways. As shown in the embodiment shown at FIG. 9, the wing 30 may be segmented into rear segment 31 and forward segment 33.

In the embodiment shown at FIG. 10, wing 40 is segmented into lower wing segment 41 and upper wing segment 43.

As it will be apparent to those skilled in the art, the manner in which the wing is segmented may affect the ability of the segment to rotate in a particular direction. As such, the direction of wing rotation may require that different segments of the wings 13A, 13B translate on each side of the aircraft.

Moreover, in an alternate embodiments multiple collars 23 may be formed on the fuselage with wing segments 15A, 15B attached to a first rotating collar, and wing segments 17A, 17B attached to a second rotating collar.

Further, the relative orientation of the wing segments during vertical or horizontal flight may vary. For example, the wing segments could transition to an "X" pattern during vertical flight or horizontal flight.

FIGS. 3-8 illustrate the direction of rotation of the propeller in the propulsion units 1, 2, 3 and 4. FIG. 3 illustrates the direction of thrust provided by propulsion units 1, 2, 3, and 4, and the direction of propeller/fan rotation. As described above, the rotation of the propulsion units 1 and 3 is opposite that of propulsion units 2, 4, which prevents spinning. However, in order to ensure that thrust from each propulsion unit is urging the aircraft in common direction, the blade angle is opposite in adjacent propulsion units. This maintains thrust in a common direction.

FIG. 4 illustrates the position of the wing segments, the direction of rotation of the propellers/fans and the thrust direction when the aircraft is in a horizontal flight mode. As shown at FIG. 4, propulsion units 1 and 3 rotate clockwise to produce forward thrust. However propulsion units 3 and 4 rotate counterclockwise to produce forward thrust.

FIG. 5 shows the relative orientation of the propulsion units 1, 2, 3 and 4 and direction of propeller/fan rotation as the wing segments 17A, 17B rotate about collar 23 into a vertical flight orientation. As described above, the aircraft may also include a second rotating collar 25, formed to rotate with wing segments 15A, 15B, as shown at FIG. 6.

The aircraft 10 may use a small motor to rotate collar 23 and the attached wing segments 17A, 17B. Alternatively the thrust direction may be used to cause the wing segments to separate or come together as the aircraft transitions between vertical and horizontal flight mode. FIG. 7 illustrates torque applied to the wing segments when aircraft is operated in the horizontal flight mode. As shown therein the torque produced by the rotation of the propeller blades, or fans urges wing segments 15A, 15B together. However, as shown at FIG. 8 wherein the direction of the propulsion units is reversed, wing segments 15A, 15B, 17A, and 17B are urged to move apart as a result of a torque applied to the wing segments by the propulsion units.

As one of ordinary skill will further recognize that different mechanisms may be used to limit or facilitate rotation the wing segments. Similarly, the sequence of translating the wings, moving the control surfaces and reversing the direction of rotation of the propulsion units may be varied without departing from the scope and spirit of the invention.

Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Accordingly, the above description is given by way of example, and not limitation. Thus, the scope of the claims is not to be limited by the illustrated embodiments.

What is claimed is:

1. A multi-engine aircraft convertible from a horizontal flight mode to a vertical flight mode, the aircraft comprising:
    an aircraft fuselage defining a fuselage longitudinal axis;
    first and second wings attached to the fuselage, each wing defining first and second wing segments, each wing segment being separately attached to the fuselage, the first wing segments of each wing being translatable about the fuselage longitudinal axis, independent of any translation of the second wing segments about the fuselage longitudinal axis, from a horizontal flight mode position adjacent the second wing segments, wherein the first and second wing segments collectively form the first and second wings, to a vertical flight mode wherein the first wing segments are substantially offset from the second wing segments, and the first and second wing segments do not collectively form the first and second wings;
    an aircraft propulsion unit attached to each of the first and second wing segments, the propulsion units attached to the first wing segment being disposed in substantial axial aliment when the aircraft operates in a horizontal mode, and being substantially offset when the aircraft operates in a vertical mode; and
    a sensor unit connected to a forward portion of the fuselage, the sensor unit defining a field of view substantially along the fuselage center axis.

2. The aircraft as recited in claim 1 wherein each of the propulsion units produce thrust substantially in the same direction when the aircraft operates in the horizontal mode.

3. The aircraft as recited in claim 2 wherein each of the propulsion units produce thrust substantially in the same direction when the aircraft operates in the vertical mode.

4. The aircraft as recited in claim 2 wherein each of the propulsion units includes a propeller.

5. The aircraft as recited in claim 3 wherein the propellers of propulsion units attached to segments of a common wing rotate in opposite directions.

6. The aircraft as recited in claim 1 wherein the first segment of the first wing and the first segment of the second wing extend along a substantially common plane.

7. The aircraft as recited in claim 1 wherein the first segment of the first wing and the first segment of the second wing are attached to collar formed in the fuselage.

8. The aircraft as recited in claim 5 wherein the direction of rotation of each of the propellers reverses as the aircraft translates between the horizontal flight mode and the vertical flight mode.

9. The aircraft as recited in claim 8 wherein the sensor field of view is directed forward of the aircraft, along the fuselage center axis, when the aircraft operates in a horizontal flight mode.

10. The aircraft as recited in claim 9 wherein the sensor field of view is directed downwardly below the aircraft, along the fuselage center axis, when the aircraft operates in the vertical flight mode.

11. The aircraft as recited in claim 1 wherein the first and second wings remain in fixed position relative to the fuselage during vertical flight mode.

12. The aircraft as recited in claim 1 wherein the first and second wings remain in fixed position relative to the fuselage during horizontal flight mode.

13. The aircraft is recited in claim 1 wherein the first and second segments are each independently attached to the aircraft fuselage.

14. The aircraft is recited in claim 1 wherein when the aircraft is in the vertical flight mode, the first and second wings segments define a substantially "X" wing configuration.

* * * * *